358-140. OR 3,070,655 SR SEARCH ROOM

Dec. 25, 1962 C. STAHL 3,070,655
MONITOR SYSTEM
Filed Feb. 8, 1960 2 Sheets-Sheet 1

T 5055

INVENTOR
Curt Stahl
BY
Harold D. Steinberg
Atty

INVENTOR
CURT STAHL
BY
Harold D. Steinberg
Atty

United States Patent Office 3,070,655
Patented Dec. 25, 1962

3,070,655
MONITOR SYSTEM

Curt Stahl, Riverdale, N.Y., assignor to U.S. Tele-Service Corporation, New York, N.Y.

Filed Feb. 8, 1960, Ser. No. 7,214
10 Claims. (Cl. 178—5.8)

Figures 1, 2, 3:
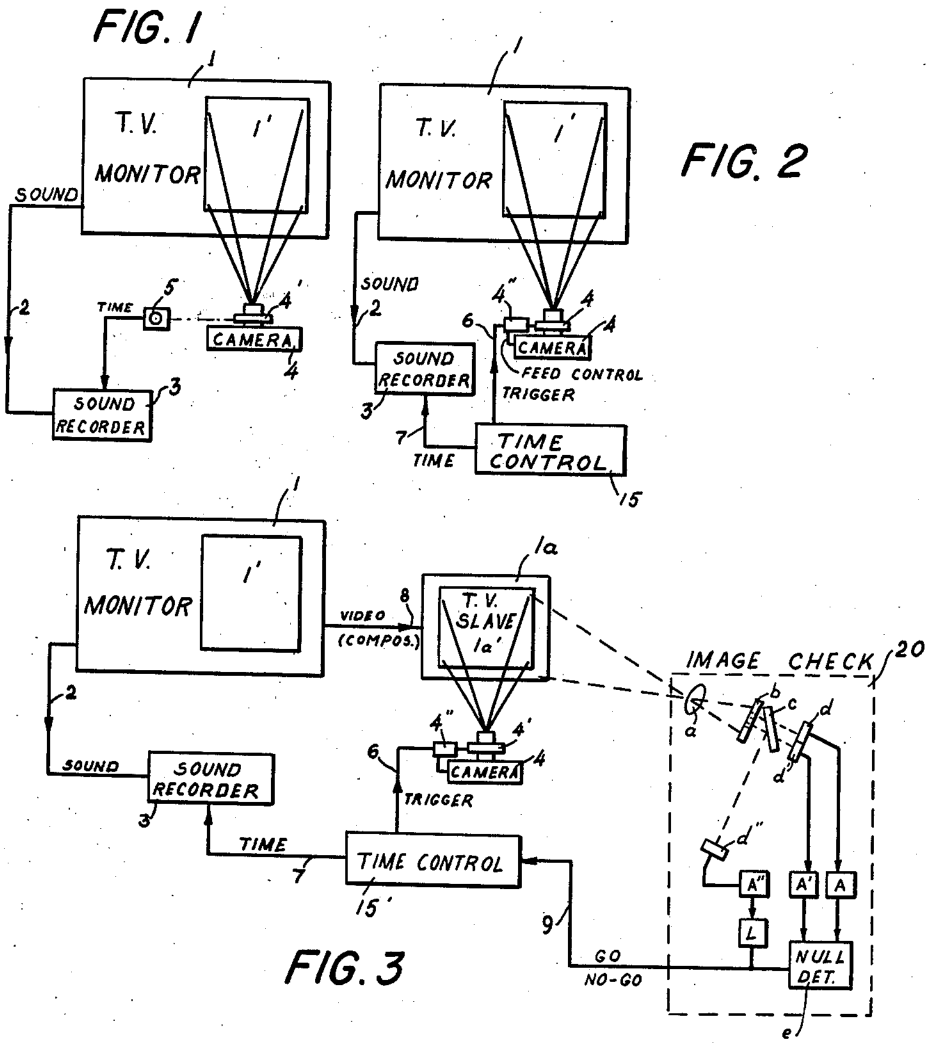

The present invention concerns a television monitoring arrangement for the purpose of obtaining accurate records of the time, duration, content and quality of selected television transmissions, particularly of commercials, emanating from one or more television transmitter stations.

It is a main object of the invention to provide for a method and arrangement capable of recording the sound content of a particular television transmission and of making photographs of the image content thereof at predetermined intervals while simultaneously recording, in relation to the sound recording, time signals occuring at the respective moments when the individual photographs are taken.

It is a further object of the invention to provide a method and arrangement of the type set forth in which the operation of the whole arrangement is fully automatic.

It is still another object of the invention to provide a method and arrangement of said type in which the quality of the image transmission is continuously checked and the operation of the arrangement is so controlled that no recordings are made unless the transmission is equal to preset standards.

With above objects in mind, a method of television monitoring according to the invention comprises the steps of recording the sound signals reproduced by television receiver apparatus upon reception of a television picture and sound transmission, taking photographs, at predetermined intervals, of the images appearing in the television receiver apparatus, simultaneously with the recording of the correlated sound signals, and recording, in fixed time relationship with the correlated sound signals, time signals simultaneously with the taking of the photographs, respectively, for recording the respective time moments at which the individual pictures are taken, whereby a correlated picture-sound record of the television transmission is obtained.

In another aspect of the invention, a television monitoring arrangement according to the invention comprises, in combination, a television receiver means having video components and audio components for receiving and reproducing television images and sound signals, respectively, photographic camera means positioned for taking pictures of television images reproduced by the television receiver means, and having shutter means; sound recording means, time control means for producing time signal pulses and for operating the shutter means simultaneously with the time signal pulses at intervals, first circuit means connecting the sound recording means with the audio components of the television receiver means for causing the sound signals to be recorded, and connecting the sound recording means with the time control means for causing the time signals to be recorded coincidentally with the sound signals.

Figure 4:
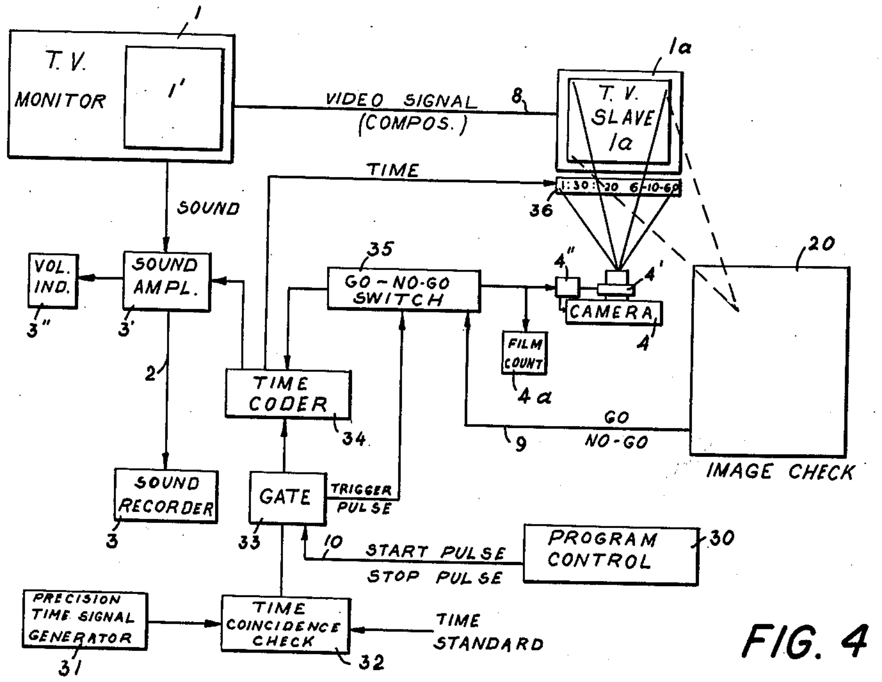
Figure 5:
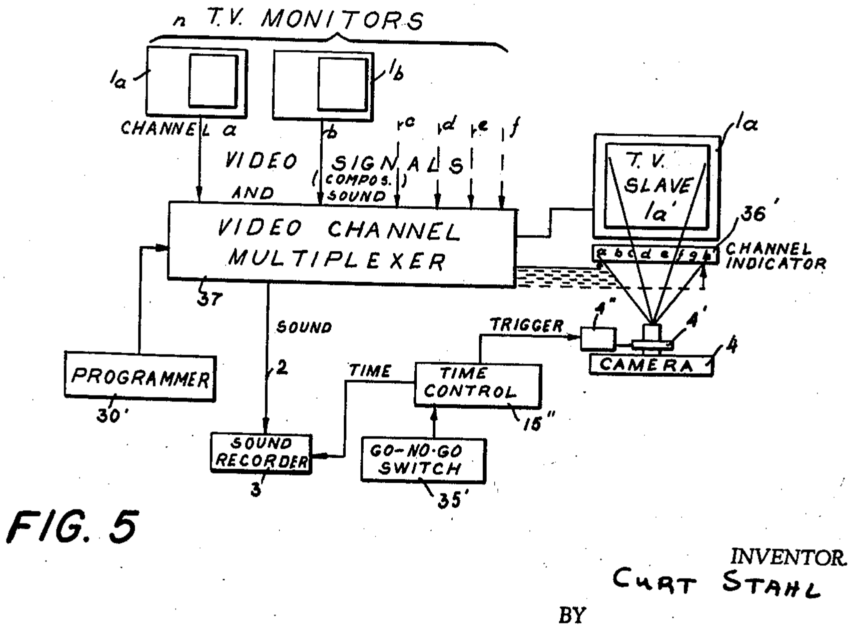

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a block diagram of a basic monitoring arrangement according to the invention, FIG. 2 is a modification of the block diagram of FIG. 1 including automatic operation means, FIG. 3 is a block diagram of a further modification of FIG. 2 comprising equipment for checking on the quality of the transmitted image, FIG. 4 is a block diagram illustrating a more elaborate version of the arrangement of FIG. 3, and FIG. 5 is a block diagram illustrating a further modification of the invention for monitoring a plurality of different channels simultaneously.

Referring now to FIG. 1, a television monitor apparatus 1 adapted to receive in conventional manner, either off the air or via a closed circuit loop, by means of its regular video components and audio components, television transmissions composed of composite video signals and sound signals, has its audio components connected by circuit means 2 with a sound recording device 3 of any conventional type so that the sound signals received by the monitor 1 are recorded on a record carrier of the tape, disc, drum or any other suitable type. A photographic camera 4 is mounted opposite the screen 1' of the monitor 1 in such a manner that the images appearing thereon are photographed by the camera 4, preferably on film, whenever the shutter 4' is operated. A time control device 5 is provided which is operatively connected both with the sound recorder 3 and with the shutter 4' of the camera 4 and is capable of operating the shutter 4' so as to make an exposure, and of simultaneously injecting a time signal into the recorder 3 to be recorded on said record carrier, either on a separate track, or superimposed on the sound signals received from the monitor 1. The time signals or pulses are generated in said time control device 5 in any conventional manner and may be in digital or any other coded form suitable for determining distinguishably on the sound record carrier the actual time of each exposure being taken upon operating the control device 5. At the same time, the moment of taking a particular picture is recorded in fixed relation to the particular sound signals recorded coincidentally therewith. The connection between the time control device 5 with the shutter 4' may be purely mechanical, or electrical if the shutter 4' is electrically operable. It can be seen that a sequence of photographs taken in this manner and showing images of the video transmission at certain interspaced time moments, together with the correlated sound record of the sound transmission forming part of that video transmission and including time records of the moments of picture taking constitute a reliable record of samples of a particular transmission, particularly suitable to check on the transmission of commercials and to establish a documentation thereof.

The example illustrated by FIG. 2 differs from FIG. 1 in that the time control device 15 contains conventional means for producing automatically pulses in predetermined intervals of e.g. 4 seconds, said pulses being of two types: one pulse is a trigger pulse which is transmitted via line 6 to an electromechanical shutter release 4'', and a simultaneous endable time signal pulse transmitted via line 7 in digital or any other coded form to the sound recorder 3 for being recorded together with the sound signals received via connection 2 as explained above. It is advisable that the shutter release 4'' is operatively connected also with the film feed mechanism (not shown) of the camera 4 so that in connection with every exposure caused by operation of the shutter 4' also the film is transported one step forward for being in position for receiving the next following exposure. If desired, the operation of the time control 15 may be controlled by pulses derived from the video components of the monitor 1.

The more elaborate modification shown by FIG. 3 differs from the embodiment of FIG. 2 in two respects.

First, the monitor 1 is supplemented by a so-called TV slave 1*a* which is a, usually small size, television receiver having a screen 1*a′* but no sound reproducing components, and therefore connected with the monitor 1 by a connection 8 only for being supplied with the composite video signal therefrom for displaying the transmitted images on screen 1*a′*. Consequently the camera 4 is mounted opposite the screen 1*a′* of the TV slave 1*a* to take photographs of the images appearing on screen 1*a′*. This arrangement is of advantage since the rather large size TV monitor 1 can be placed at a location remote from that of the slave 1*a* and the camera 4, so that in a laboratory or studio a plurality of slaves 1*a* with the pertaining cameras 4 can be arranged within a practical small area, while other space may be assigned to the corresponding monitors 1 remote therefrom. In this case evidently a plurality of channels of television transmission may be monitored and checked in the manner set forth simultaneously and independently from each other.

Second, if desired, the arrangement may be supplemented by an image check device 20 for continuously ascertaining the picture quality of the video transmission. The image check device 20 is for this purpose connected by a line 9 with the time control device 15′ which in this case comprises also electrically operable switch means responsive to signals transmitted to it via line 9, these control signals being either "Go" signals emitted by the image check device 20 when the picture quality is equal to a predetermined standard, or "No-Go" signals (or also simply "no-signal") appearing when the picture quality is not satisfactory. In other words, the time control will be operative only when the picture quality is within given standards.

The image check device is composed of conventional elements and capable of checking on "gamma" i.e. on the picture density which, if gamma=1.0 represents black, should be between gamma values expressed by .6 and .9 to be satisfactory, further to check on focus, interlace and horizontal and vertical synchronization of the video signals. Devices capable of carrying out such checks are known, and could furnish either an optical indication, or an electrical pulse, or a certain voltage output, all of these elements of information being representative of an assessed picture quality within predetermined standards. It is apparent, that in the case of a purely optical indication a connection 9 between the image check device 20 and the time control device 15′ would be unnecessary since in this case a switch device in the latter device could be operated manually by an observer or operator whenever the "Go" or "No-Go" condition prevails and is so indicated.

By way of example, a block diagram of a possible composition of an image check device 20 is shown in FIG. 3. The beams of light emanating from the slave screen 1*a′* are caused to pass through an optical system *a* from where they will travel through a mask *b* having two narrow slits arranged parallel with the lines of the scanning raster on the screen, and spaced from each other so that the images of two selected lines (or portions thereof) normally pass through the slits, respectively. These two line images are projected onto a split photocell *d*, *d′* which are respectively in circuit with amplifiers A, A′. The output of these amplifiers which corresponds to the light intensity of the line images impinging on the respective cell halves *d*, *d′* is fed into a null detector device *e* which integrates the inputs and compares them. It is evident that whenever focus, interlace or synchronization is not correct or not working correctly, the outputs of the amplifiers, A, A′ will not be balanced which would result in a corresponding pulse or signal of "Go" or "No-Go" character transmitted via line 9 to the time control 15′.

Between the mask *b* and the split photocell *d*, *d′*, a semitransparent mirror *c* is arranged which diverts the line image coming from the screen 1*a′* toward a further photocell *d″* connected with a third amplifier A″ the output of which is delivered to a light meter or gamma discriminator L. The device L may, for the reasons set forth above, be just an indicator of the gamma value of the picture on screen 1*a′*, or, as shown, be a device furnishing an electrical signal proportional thereto. If the output of the device L is injected into the line 9 in addition to the output of the null detector *e* the above mentioned switch in the time control device 15′ can be set to respond to a "Go" signal composed of the total output of the devices L and *e* together, i.e. only if all the quality factors as mentioned above are within the predetermined standards. The lack of an output of such magnitude would be tantamount to a "No-Go" signal.

The still further developed embodiment of the invention shown by FIG. 4 contains the elements 1, 1*a*, 3, 4, 4′, 4″, and 20 identically as FIG. 3, but in addition a program control device 30 and other advantageous components. Inserted in the connection 2 between monitor 1 and sound recorder 3 is a sound amplifier 3′ which is connected with a sound volume indicator 3″ serving to indicate whether the volume of the transmitted sound signal is within the prescribed range. If this were not the case a recording of the transmission would be useless. The time signals are primarily generated by a precision time signal generator 31 which furnishes time signal pulses at predetermined regular intervals. These pulses are fed to a time coincidence checking device 32 (of also conventional type) which compares the time pulses with an available outside time standard such as W.W.V. or C.H.U. whereby any possible deviations of the pulse generator 31 are corrected. From the device 32 the time pulses are transmitted to a gate of standard type 33 which, when in conductive condition, permits the passage of the time pulse to a time coder 34. This device converts the consecutive pulses into audible coded time signals respectively characteristic of the consecutive time pulses in their numerical order. The time coder 34 is connected, on one hand, with the sound amplifier 3′ for transmitting to the latter said coded time signals for amplification and transmission to the recorder 3 for the purpose mentioned above. At the same time, and simultaneously with the transmission of said coded time pulses, the coder 34 transmits a pulse or signal to a time indicator device 36 arranged close to the screen 1*a′* of the slave 1*a*. This indicator is capable of visibly displaying in the manner of known types of electric watches or clocks, in figures or symbols an indication of the actual times when said impulses occur, e.g. in the form of an indication of hour, minute and second of the day of the particular transmission, and if possible even including the date of such day, as is indicated in FIG. 4. FIG. 4 shows that in this case the camera 4 takes not only a picture of the image appearing on screen 1*a′* but also a picture of the time indication displayed on the device 36 whereby in the final recording of a telecast the correlation of the sound recordings comprising the above mentioned coded time signals, with the photographs taken at the respectively corresponding moments is greatly facilitated.

A "Go"-"No-Go" switch 35 is provided for controlling the operation of the so far described arrangement. It is connected between the gate 33 and the camera shutter control 4″ and if in circuit-closing position it will permit the transmission of a trigger pulse from gate 33 to the shutter control 4″ for operating the latter at the time intervals of the above mentioned primary time pulses. In addition, the time coder 34 may be controlled also by the switch 35 as shown in FIG. 4.

The "Go"-"No-Go" switch device 35 contains actuating means responsive to "Go"/"No-Go" signals furnished in the manner set forth above by the image check device 20 via line 9.

It can now be seen that whenever the switch 35 is placed in circuit-closing position the whole recording operation is performed completely automatically provided that the sound recorder 3 and the time signal generator 31 are in operation, fed with power from an outside source not shown, and provided that the image check device 20 does not take the switch 35 out of said circuit-closing position due to faults of the video transmission appearing on the screen 1*a'*.

It has been stated above that the operation of the arrangement depends, in the first place, upon the gate 33 being in conductive condition. This gate is responsive to a program control device 30 with which it is connected by lead 10. The control device 30 may be of any conventional type used for programming and serves to transmit "start" and "stop" pulses to the gate 33 whenever start or termination of the monitoring operation is desired. The program control device 30 may be set e.g. for all those times of a day or a plurality of days when those commercials or other television transmissions are scheduled to occur which are to be monitored. A "start" pulse would place the gate 33 in conductive condition, a "stop" pulse would have the opposite effect.

It is apparent that the program control 30 or the switch 35, or both, could be replaced by manual switch means to be operated by hand without changing the otherwise automatic operation of the arrangement.

For the sake of completeness a film counter 4*a* is shown connected with the line operating the shutter control 4'', for counting the number of film exposures.

Without repeating all the details of the above described embodiments FIG. 5 illustrates a highly advantageous arrangement suitable for monitoring a plurality of *n* channels while using only one TV slave apparatus and only one camera, in connection with *n* TV monitors.

Of a plurality of *n* monitors only monitors $1_a$ and $1_b$ tuned to channels *a* and *b* are shown, each being connected, as shown to a video channel multiplexer device 37. Similar connections for other channels *c*, *d* etc. are indicated. From the individual monitors $1_a$, $1_b$, etc. both the composite video signals and the sound signals of their respective channels are transmitted to the multiplexer 37. From the multiplexer 37 the sound signals are transmitted via line 2 to the sound recorder 3, while the composite video signals are transmitted via line 8 to the slave 1*a*. The multiplexer 37 is actually a multiple switch device which is capable of being moved between a plurality of different circuit-closing positions, in each such position connecting only one of said monitors (channels) with the sound recorder 3 and the slave 1*a*, alternately. The multiplexer 37 is operated i.e. moved between said different positions respectively corresponding to various channels or monitors adjusted for such channels, by means of a programmer device 30' which in a manner known from conventional programming devices can be set to cause periodically a change of position of the multiplexer so as to sequentially cause the monitoring of different selected channels as may be desired. It would not cause any difficulty to operate the multiplexer by means of the programmer in such a manner that the slave 1*a* is operatively connected consecutively with different monitors for a rather short period of time, each of said periods encompassing an interval sufficient for having at least one picture taken by the camera and for having the film fed to a new position, every consecutive picture taken being that of the image on screen 1*a'* derived from video transmission from a different channel, respectively. In this manner, at a great saving of equipment a substantial number of channels could be monitored while the arrangement is substantially continuously in operation.

In FIG. 5 a time control 15'' responsive to a "Go"-"No-Go" switch 35' and connected to furnish a coded time signal to the recorder 3 and a trigger signal to the shutter control 4'' is also shown. The switch 35' could be operated manually or by an image check device 20 as shown in FIGS. 3 and 4, and the specific arrangement of FIG. 5 could also be combined with the details of the arrangement of FIG. 4.

In the case of FIG. 5 it is advisable to arrange close to the screen 1*a'* a channel indicator 36' which is controlled electrically or electromagnetically, e.g. like a bell-board or signal indicator, from the multiplexer 37 to indicate at any time for the monitoring of which channel the multiplexer 37 and thereby the slave 1*a* has been set. The camera 4 is arranged to take with every exposure not only a picture of the screen 1*a'* but also of the channel indication appearing as a number or symbol on the optical indicator 36' so that on the film strip the consecutive frames will be easily identifiable as to which channel they refer.

It will be understood that each of the elements described above, or two or more together, may also find a useful application in other types of method and arrangement for television monitoring differing from the types described above.

While the invention has been illustrated and described as embodied in method and arrangement for television monitoring with photographic and sound recording, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An automatic television monitoring arrangement, comprising, in combination, television receiver means having video components and audio components for receiving and reproducing television images and sound signals, respectively; photographic camera means positioned for taking pictures of television images reproduced by said television receiver means, and having electrically operable shutter means; sound recording means; time control means for producing time signal pulses and simultaneously trigger pulses at predetermined intervals; first circuit means connecting said sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

2. An arrangement as claimed in claim 1, wherein said camera means comprises film feeding means operable by said trigger pulses in such a manner that for each shutter operation a new film frame is placed in position for exposure.

3. An automatic television monitoring arrangement, comprising, in combination, television receiver means having video components and audio components for receiving and reproducing television images and sound signals, respectively, and including television monitoring means and television slave means connected therewith for receiving and reproducing only television images simultaneously with images reproduced by said monitoring means; photographic camera means positioned for taking pictures of television images reproduced by said television slave means, and having electrically operable shutter means; sound recording means; time control means for producing time signal pulses and simultaneously trigger pulses at predetermined intervals; first circuit means connecting said sound recording means with said audio components of said television receiver means for causing said sound signals to be recorded, and connecting said sound recording means with said time control means for causing said time signals to be recorded coincidentally with said sound signals; second circuit means connecting said time control means with said shutter means for transmitting said trigger pulses thereto so as to operate said camera means at the respective time intervals of said trigger pulses; and third circuit means connecting said time control means with said video components of said television receiver means for transmitting control pulses therefrom to said time control means so as to operate the latter.

4. An automatic television monitoring arrangement, comprising, in combination, television receiver means having video components and audio components for receiving and reproducing television images and sound signals, respectively; photographic camera means positioned for taking pictures of television images reproduced by said television receiver means, and having electrically operable shutter means; sound recording means; time control means for producing time signal pulses and simultaneously trigger pulses at predetermined intervals; picture quality control means including photo-electric means exposed to said television images for being energized by light signals derived therefrom, and picture quality checking means connected between said photo-electric means and said time control means for preventing operation of the latter unless the picture quality determined by said quality checking means is equal to a predetermined standard; first circuit means connecting said sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

5. An automatic television monitoring arrangement, comprising, in combination, television receiver means having video components and audio components for receiving and reproducing television images and sound signals, respectively, and including television monitoring means and television slave means connected therewith for receiving and reproducing only television images simultaneously with images reproduced by said monitoring means; photographic camera means positioned for taking pictures of television images reproduced by said television slave means, and having electrically operable shutter means; sound recording means; time control means for producing time signal pulses and simultaneously trigger pulses at predetermined intervals; picture quality control means including photo-electric means exposed to said television images for being energized by light signals derived therefrom, and picture quality checking means connected between said photo-electric means and said time control means for preventing operation of the latter unless the picture quality determined by said quality checking means is equal to a predetermined standard; first circuit means connecting said sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

6. An automatic television monitoring arrangement, comprising, in combination, television receiver means having video components and audio components for receiving and reproducing television images and sound signals, respectively, and including television monitoring means and television slave means connected therewith for receiving and reproducing only television images simultaneously with images reproduced by said monitoring means; photographic camera means positioned for taking pictures of television images reproduced by said television slave means, and having electrically operable shutter means; sound recording means; time control means for producing time signal pulses and simultaneously trigger pulses at predetermined intervals; time indicating means connected with said time control means for being operated thereby in such a manner that at any time of operation the actual time is visibly indicated, said time indicating means being located within the picture taking area of said camera means so that a picture taken by the latter includes a time indication visible on said time indicating means; picture quality control means including photo-electric means exposed to said television images for being energized by light signals derived therefrom, and picture quality checking means connected between said photo-electric means and said time control means for preventing operation of the latter unless the picture quality determined by said quality checking means is equal to a predetermined standard; first circuit means connecting said sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

7. An automatic television monitoring arrangement, comprising, in combination, television receiver means having video components and audio components for receiving and reproducing television images and sound signals, respectively, and including television monitoring means and television slave means connected therewith for receiving and reproducing only television images simultaneously with images reproduced by said monitoring means; photographic camera means positioned for taking pictures of television images reproduced by said television slave means, and having electrically operable shutter means; sound recording means; time control means for producing time signal pulses and simultaneously trigger pulses at predetermined intervals; programmer means in circuit with said time control means and capable of storing a predetermined operational schedule and of energizing and de-energizing said time control means at times corresponding to such schedule; picture quality control means including photo-electric means exposed to said television images for being energized by light signals derived therefrom, and picture quality checking means connected between said photo-electric means and said time control means for preventing operation of the latter unless the picture quality determined by said quality checking means is equal to a predetermined standard; first circuit means connecting sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

8. An automatic television monitoring arrangement, comprising, in combination, television receiver means having video components and audio components for receiving and reproducing television images and sound signals, respectively, and including television monitoring means and television slave means connected therewith for receiving and reproducing only television images simultaneously with images reproduced by said monitoring means; photographic camera means positioned for taking pictures of television images reproduced by said television slave means, and having electrically operable shutter means; sound recording means; time control means for producing time signal pulses and simultaneously trigger pulses at predetermined intervals; programmer means in circuit with said time control means and capable of storing a predetermined operational schedule and of energizing and de-energizing said time control means at times corresponding to such schedule; time indicating means connected with said time control means for being operated thereby in such a manner that at any time of operation the actual time is visibly indicated, said time indicating means being located within the picture taking area of said camera means so that a picture taken by the latter includes a time indication visible on said time indicating means; picture quality control means including photo-electric means exposed to said television images for being energized by light signals derived therefrom, and picture quality checking means connected between said photo-electric means and said time control means for preventing operation of the latter unless the picture quality determined by said quality checking means is equal to a predetermined standard; first circuit means connecting said sound recording means with said audio components of said television receiver means for causing said sound signals to be recorded, and connecting said sound recording means with said time control means for causing said time signals to be recorded coincidentally with said sound signals; and second circuit means connecting said time control means with said shutter means for transmitting said trigger pulses thereto so as to operate said camera means at the respective time intervals of said trigger pulses.

9. A television monitoring arrangement, comprising, in combination, television receiver means having video components and audio components for receiving and reproducing television images and sound signals, respectively; photographic camera means positioned for taking pictures of television images reproduced by said television receiver means, and having shutter means; sound recording means; time control means for producing time signal pulses and for operating said shutter means simultaneously with said time signal pulses at intervals; first circuit means connecting said sound recording means with said audio components of said television receiver means for causing said sound signals to be recorded, and connecting said sound recording means with said time control means for causing said time signals to be recorded coincidentally with said sound signals.

10. A method of television monitoring, comprising the steps of recording the sound signals reproduced by television receiver apparatus upon reception of a television picture and sound transmission; taking photographs, at predetermined intervals, of the images appearing in said television receiver apparatus, simultaneously with said recording of the correlated sound signals; and recording, in fixed time relationship with said correlated sound signals, time signals simultaneously with said taking of said photographs, respectively, for recording the respective time moments at which said individual pictures are taken, whereby a correlated picture-sound record of the television transmission is obtained.

References Cited in the file of this patent

UNITED STATES PATENTS 2,628,274 Homrighous ----------- Feb. 10, 1953